(No Model.) 7 Sheets—Sheet 1.

F. F. RAYMOND, 2d.
HEEL LOADING MACHINE.

No. 480,415. Patented Aug. 9, 1892.

WITNESSES

INVENTOR (No Model.) 7 Sheets—Sheet 2.
F. F. RAYMOND, 2d.
HEEL LOADING MACHINE.
No. 480,415. Patented Aug. 9, 1892.
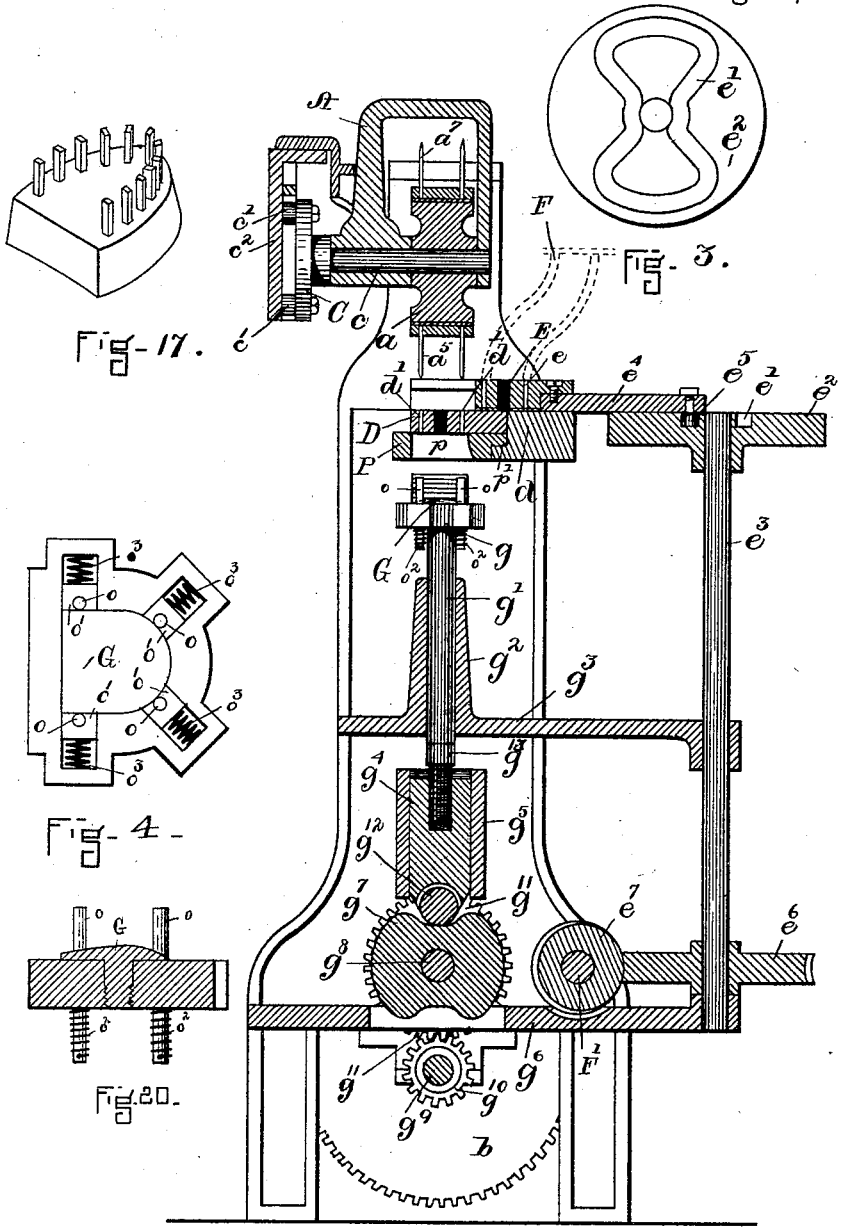
WITNESSES          Fig. 2.          INVENTOR (No Model.)
F. F. RAYMOND, 2d.
HEEL LOADING MACHINE.
No. 480,415. Patented Aug. 9, 1892.
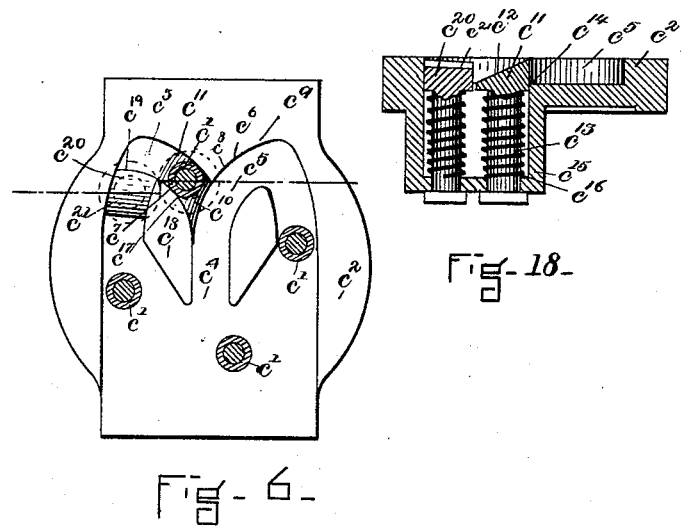
Fig-18-
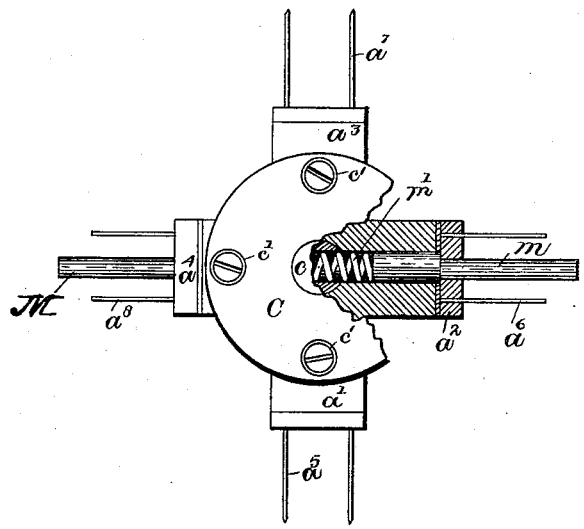
Fig-6-
Fig-7-
WITNESSES
INVENTOR (No Model.)  7 Sheets—Sheet 5.

F. F. RAYMOND, 2d.
HEEL LOADING MACHINE.

No. 480,415. Patented Aug. 9, 1892.

WITNESSES.
J. M. Dolan.
A. F. Macdonald.

INVENTOR.
F. F. Raymond 2d

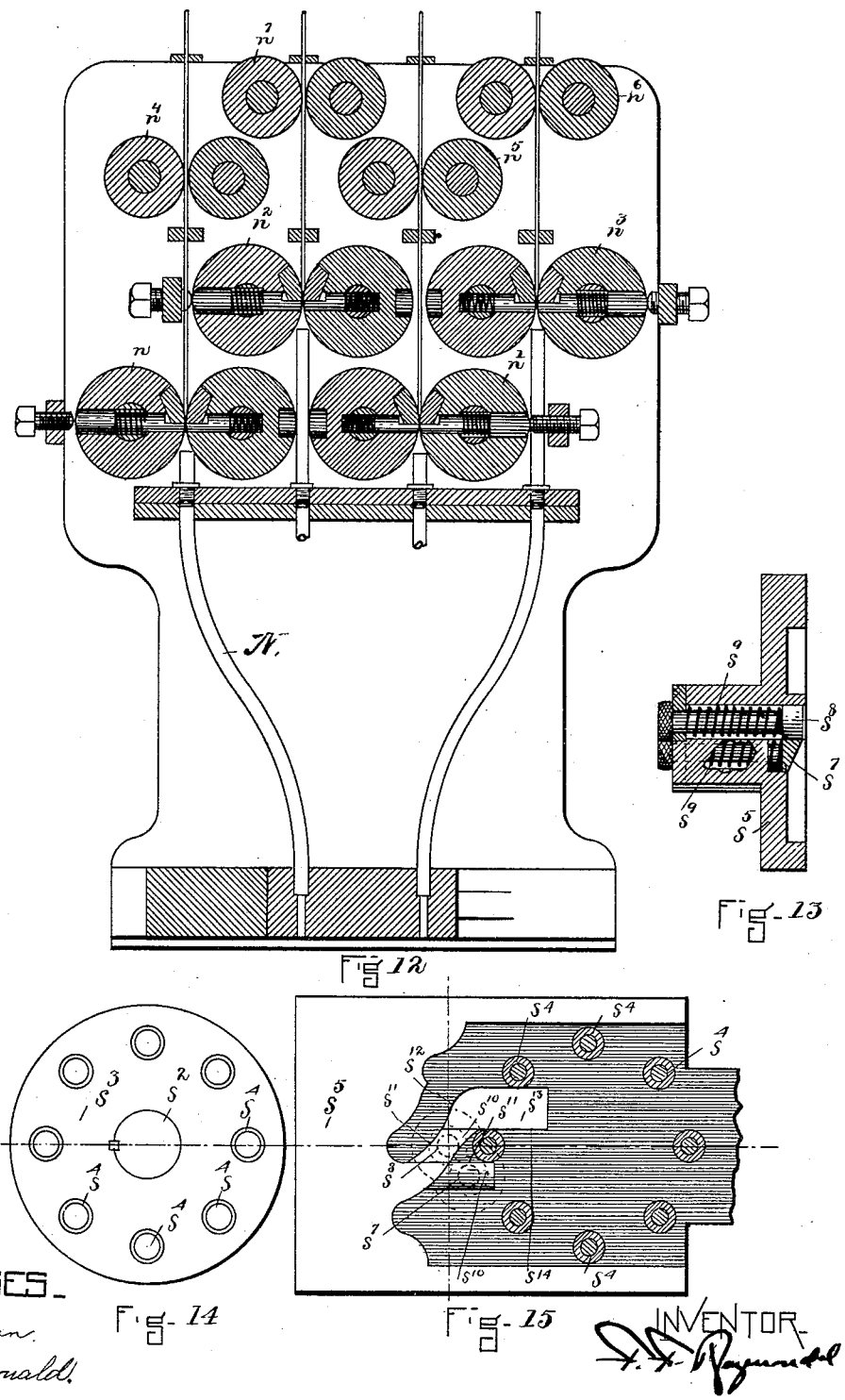

UNITED STATES PATENT OFFICE.

FREEBORN F. RAYMOND, 2D, OF NEWTON, MASSACHUSETTS.

HEEL-LOADING MACHINE.

SPECIFICATION forming part of Letters Patent No. 480,415, dated August 9, 1892.

Application filed February 11, 1889. Serial No. 299,517. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel-Loading Machines, of which the following is a full, clear, and exact description, reference being had to the accompanying drawings, forming a part of this specification, in explaining its nature.

The invention relates to a machine for automatically loading or loading and compressing heel-blanks; also, to various details of organization and construction of the mechanism employed.

Figure 1:
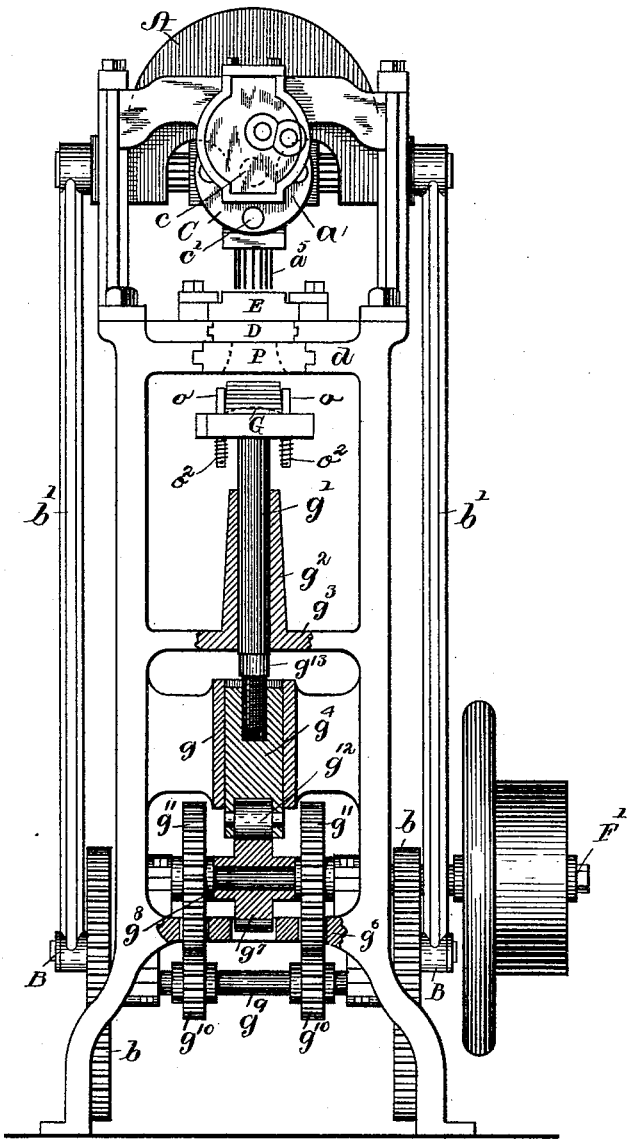
Figure 16:
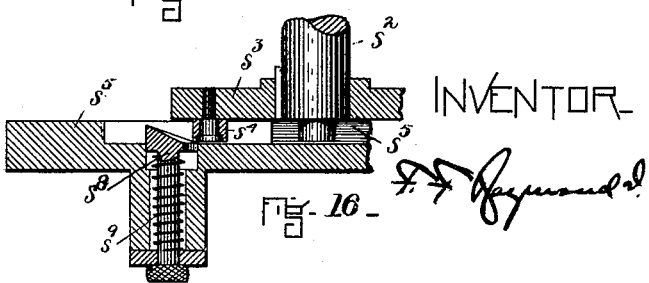
Figure 5:
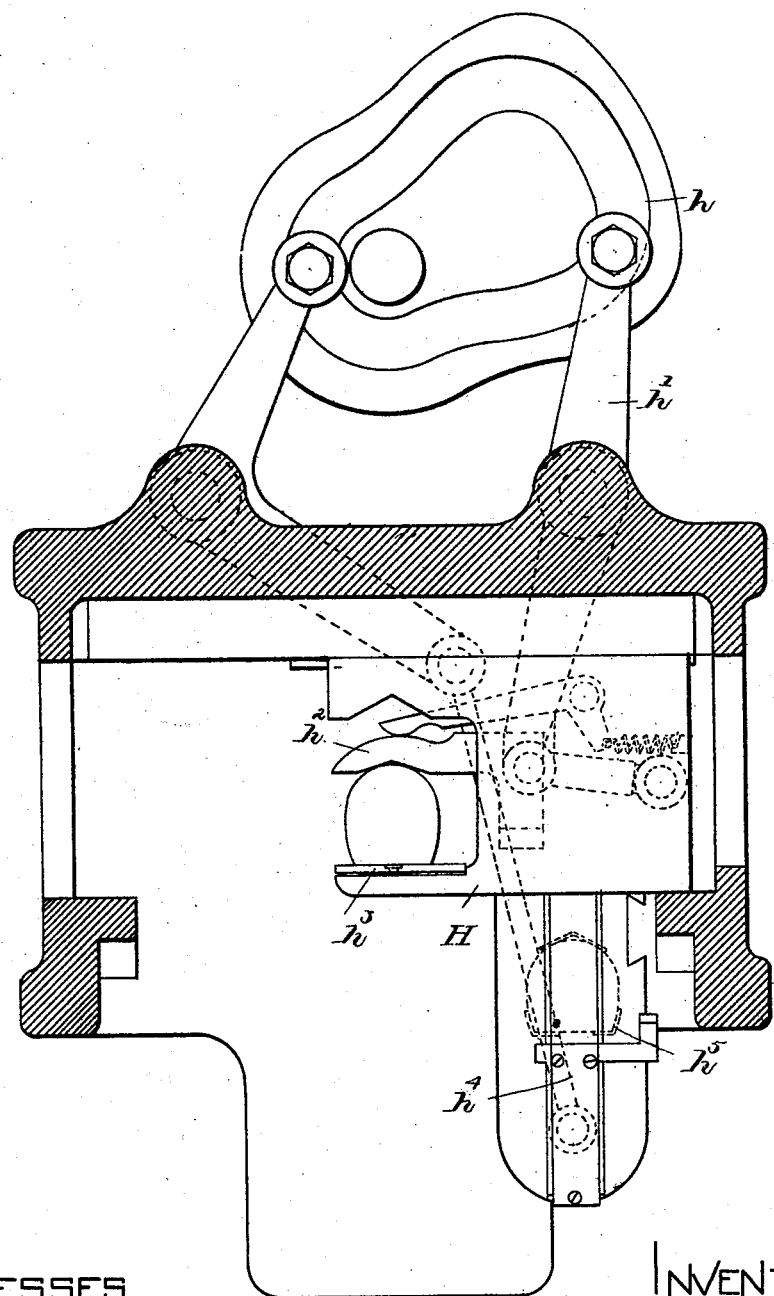
Figure 8:
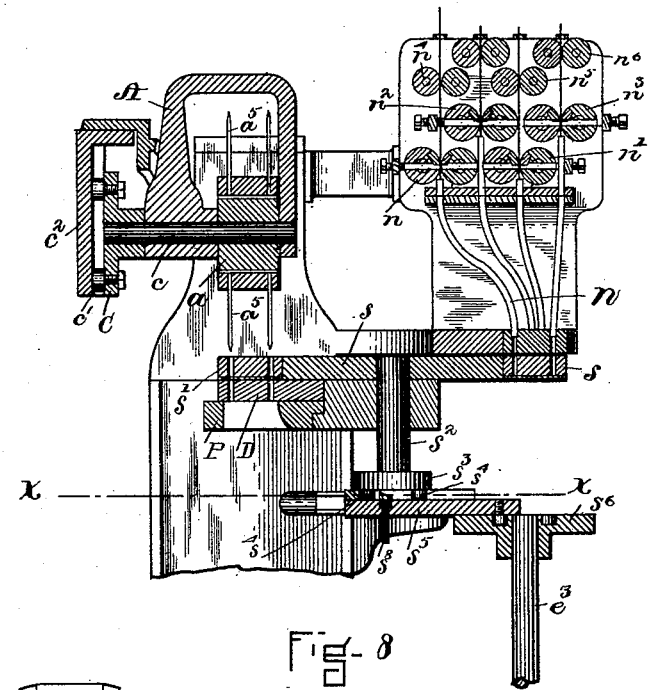
Figure 9:
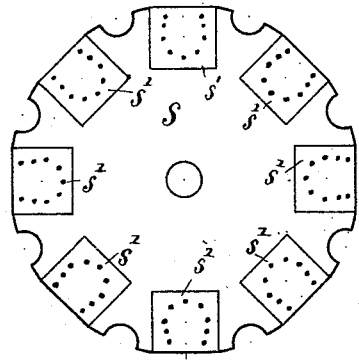
Figure 10:
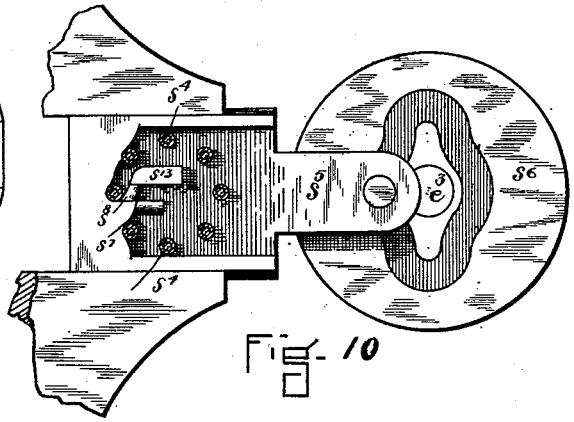
Figure 11:
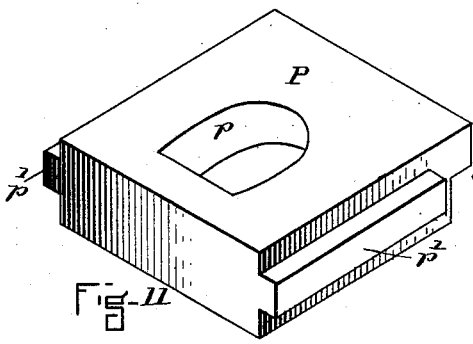
Figure 19:
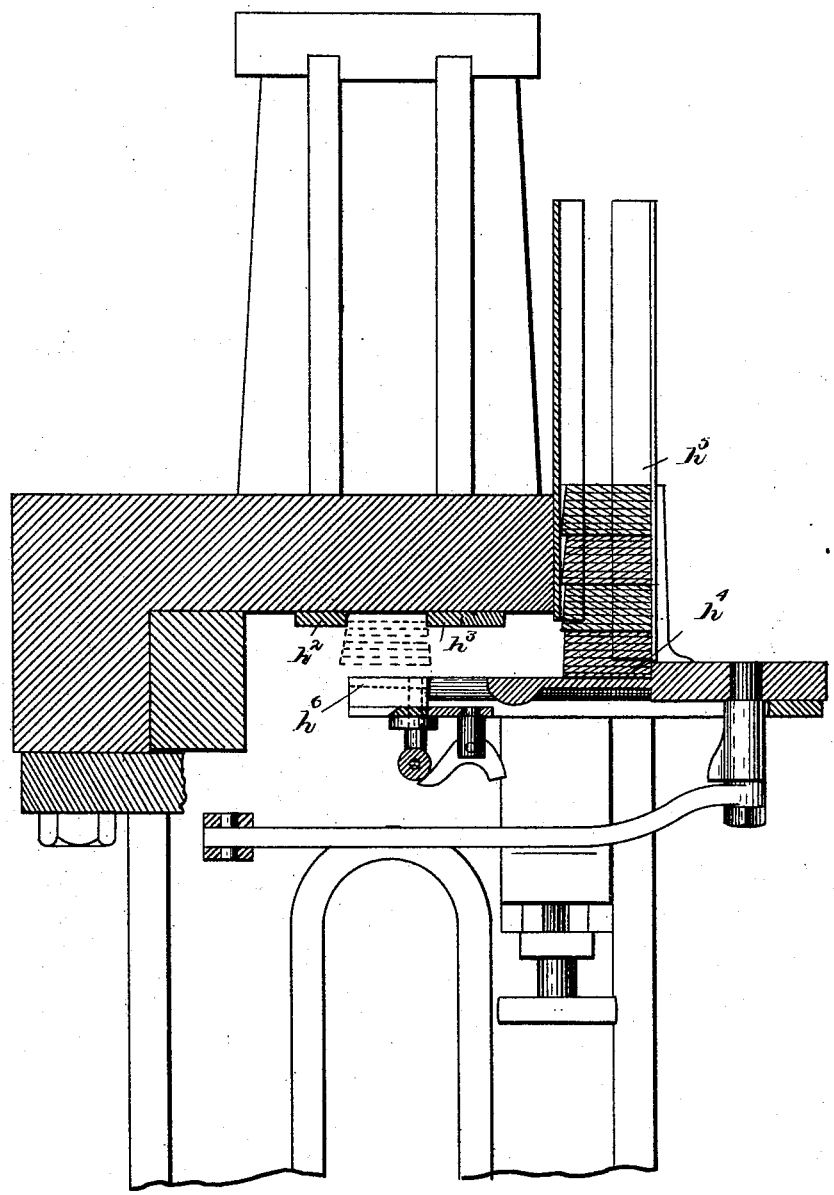

Referring to the drawings, Figure 1 is a view in front elevation of a machine having the features of my invention, the nail-supplying devices not being shown. Fig. 2 is a view in vertical central section thereof, taken from front to rear of the machine, without the nail-supplying devices. Fig. 3 is a view in plan of the cam for operating the nail-carrier plate. Fig. 4 is a view in plan of the support for the heel. Fig. 5 is a detail view illustrating the mechanism for automatically feeding heel-blanks from a stack to a position beneath the templet. Fig. 6 is a view in rear elevation of the devices for automatically turning the rotary head. Fig. 7 is a view of the rotary head, also showing heel-blank ejectors, to which reference is hereinafter made. Fig. 8 is a view illustrating the relation which the automatic nail-feeding devices bear to the nailing-machine, and also a peculiar form of nail-feeding plate and mechanism for operating it. Fig. 9 is a view in plan of the nail-feeding or carrier-plate represented in Fig. 8 and the nail-carrier supported thereby. Fig. 10 is a view below the dotted line $x\ x$ of Fig. 8, illustrating the mechanism for rotating the nail-carrier represented in that figure and in Fig. 9. Fig. 11 is a view of a removable solid die, which is used when the heel-blanks are to be compressed laterally, as well as vertically. Fig. 12 is a view in vertical section taken through the nail-supplying devices. Figs. 13, 14, 15, and 16 are detail views of the mechanism for turning the carrier-plate represented in Fig. 8. Fig. 17 is a view of a loaded heel-blank. Figs. 18 to 20, inclusive, are detail views.

A represents the cross-head. It supports a revolving head $a$, having the arms $a'\ a^2\ a^3\ a^4$. The arm $a'$ supports a gang or group of awls $a^5$. The arm $a^2$, which is the next in order, supports a gang or group of drivers $a^6$. The arm $a^3$ supports a second gang or group of awls $a^7$, which are of the same size and of the same arrangement as the gang or group of awls $a^5$. The arm $a^4$ supports a second group of drivers $a^8$, which are of the same size and order of arrangement as the gang $a^6$. The cross-head A is reciprocated by means of the crank-pins B, formed on the gears $b$ and the connecting pitmen or rods $b'$. The revolving head $a$ is automatically rotated upon the reciprocation of the cross-head by means of mechanism substantially like that described in the application of C. C. Small for a patent, filed April 19, 1888, and which in substance comprises automatic rotating mechanism, which consists, in brief, of a disk C, attached to the shaft $c$ of the rotary head, which disk carries four cam-pins $c'$, extending from the face thereof and near its edge, and the mechanism further comprises a plate $c^2$, having the stationary cam or guide grooves $c^3\ c^4\ c^5$. Each of the cam-grooves $c^3\ c^5$ is connected with the central cam-groove $c^4$ near the upper end of the central cam-groove, and these grooves are arranged to permit the rotary movement of the cam-pins. The rotary movement is communicated to the disk by means of the inclined or curved surfaces $c^6\ c^7$. Upon the upward movement of the cross-head a cam-pin $c'$ comes in contact with the inclined surface $c^6$, which is made up in part of the surface $c^8$ of the stationary portion $c^9$ of the plate and in part of the surface $c^{10}$ of the latch-block $c^{11}$, this latch-block being movable horizontally out of and into the groove $c^3$ by the passage of a cam-pin by it and the force of a spring acting behind it to push it into the groove, and when in the groove it serves as a stop in preventing the cam-pin from returning from the straight groove into the curved groove, by which it entered the straight groove, its edge acting as a guide in causing the cam-pin to move upon the upward movement of the cross-head along the turning surface $c^6$. The latch-block $c^{11}$ is made as a solid block of metal having the inclined surface $c^{12}$ and a stud $c^{13}$, and it is movable in a hole $c^{14}$, cut in the plate $c^2$, and is held by the plate and a boss $c^{15}$, cast thereon, a spring $c^{16}$ serving to automatically return it to its original position. The guiding-surface $c^7$ is formed by the surface $c^{17}$ of the stationary section $c^{18}$ of the plate and the surface $c^{19}$ of the movable block $c^{20}$. The movable block is mounted upon the plate and made movable in relation to the groove in the same manner as the block $c^{11}$ and has an inclined surface $c^{21}$, with which the ends of the cam-pins are successively brought in contact upon the upward movement of the cross-head, the surface $c^{19}$ of the block forming both a stop and a guide. This mechanism causes the rotary head to make a complete revolution for every four reciprocations of the cross-head.

D is the templet. It is removable from the upper table $d$ of the machine which supports it; but it is preferably not provided with a vertical or yielding movement. It has the holes $d'$, in which the awls and drivers are reciprocated.

E is a nail-carrier. It has the holes $e$ for receiving the nails, and in Fig. 2 it is represented as moved automatically from the nail-supplying devices F to the templet D by means of a cam-groove $e'$ and the cam-disk $e^2$ on the vertical shaft $e^3$ and a slide-plate $e^4$, to which the nail-carrier is secured and which has a cam-pin $e^5$ entering the cam-groove. The cam-groove is constructed to provide the nail-carrier E with two feeding movements in relation to the templet D for every full revolution of the rotary head—that is, it is in its back position receiving nails during the reciprocation of the first gang of awls, is moved forward to deliver the nails upon the lifting of the cross-head and before the reciprocation of the first gang of drivers, remains in position over the templet during the operation of the first gang of drivers, is withdrawn during the upward movement of the first gang of drivers to receive the second gang or group of nails from the nail-feeding devices and during the reciprocation of the second group of awls, and is moved forward again to deliver a second group of nails to the holes of the templet D in season to receive the second group of drivers. The shaft $e^3$ preferably is rotated by means of the worm-wheel $e^6$ and the worm $e^7$ upon the pulley-shaft F', and the pulley-shaft is connected with the gears $b$, bearing the crank-pins B, by means of pinions $f$.

G is the heel-support or pressure-block. It is removably secured to the upper end $g$ of the pressure-spindle $g'$, the pressure-spindle being supported by the post $g^2$, extending upward from the middle table $g^3$, and it is provided with a vertical movement by means of the pressure-head $g^4$, having a vertical movement in the post $g^5$, extending from the frame, as shown, or upward from the lower table $g^6$ and the edge cam $g^7$ upon the cam-shaft $g^8$. This cam-shaft has suitable bearings and is connected with the shaft $g^9$, to which the gears $b$ are attached by means of pinions $g^{10}$ on the shaft $g^9$ and gears $g^{11}$ on the shaft $g^8$, which mesh with the pinion $g^{10}$. There is an anti-friction roll $g^{12}$ on the lower end of the pressure-head $g^4$ to bear upon the edge of the cam. The cam $g^7$ is constructed or shaped to provide the pressure-head with these movements in relation to the templet in every revolution: first, a quick upward movement to compress the heel-blank against the under surface of the templet; second, a period of rest, or practically of rest, during the driving of the nails; third, a quick release of the heel-blank to permit its removal and the feeding of another heel-blank; fourth, a second upward compressing movement to compress a second heel; fifth, a period of rest during the driving of the nails into the second heel, and, sixth, a downward releasing movement.

There is attached to the upper end of the head $g^4$ an adjustable bearing-block $g^{13}$, upon which the lower end of the spindle $g'$ rests, and which is made with a screw to fit the screw-thread in the end of the head, whereby it is made vertically adjustable in relation thereto. When the heel-blank is not side-compressed in a die, the heel-blanks are fed automatically into position beneath the templet by heel-blank-feeding devices, substantially like those shown and described in the said Small application and comprising, in substance, a heel-blank slide-plate H, operated by a cam $h$ on the cam-shaft $e^3$ and lever $h'$ and bearing the heel-blank-holding devices $h^2$ $h^3$, and the heels are fed to these holding devices by a slide $h^4$, which removes them one by one from a stack $h^5$ to a lifting-diaphragm $h^6$, which lifts them into position to be grasped by the heel-grasping devices, one of the grasping devices being moved or opened automatically by a projection on the slide $h^4$ to permit the lifting-diaphragm to act to place the heel. The slide $h^4$ is operated by means of the said cam $h$, a connecting-lever, and a link. This mechanism or the equivalent for it has already been described in the said Small application, and also in my pending application filed April 19, 1887, and need not further be described here. It is only necessary to say that the cam is constructed to move the heel-carrier to feed a heel-blank upon the upward movement of each gang of drivers into position and to withdraw the carrier as soon as the heel-blank is compressed against the templet and during the upward movement of the awls, in order that it may receive another heel-blank from the stack.

Each gang of drivers is made as to length to partly drive the nail into the heel-blank, a loaded heel-blank being a heel in which the attaching-nails are partially driven and which is adapted to be subsequently attached to the soles of the boot or shoe by independent nail-driving devices. To move or free the loaded heel-blank from the templet after the driving of the nails, I mount in the arms $a^2$ $a^4$ of the rotary head independent releasing-pins M, each of which is movable therein, a strong spring $m'$ being placed back of each to force it outward. Each pin extends from its respective arm farther than the drivers and is adapted to enter a hole in the nail-carrier and templet, and in the operation of the machine it is brought into contact with the upper surface of the heel-blank during the downward movement of the rotary head and rests there during the driving of the nails; but upon the upward movement of the head, the pressure-head being immediately released, the pin is forced downward by the spring sufficient to throw or push the heel-blank from the templet, causing it to follow the heel-support and freeing the nails from the templet. Of course these push-pins can be positively operated, if desired.

The nail-supplying devices F preferably are like those described in my application for Letters Patent of the United States filed March 31, 1888, Serial No. 269,055, and which comprise a distributer N, the rolls $n$ $n'$ $n^2$ $n^3$, carrying groups of nail pointing and severing devices, the feed-rolls $n^4$, $n^5$, $n^6$, and $n^7$, and their operating mechanism, the machine being organized to make a gang or group of nails simultaneously from the ends of as many wires as there are nails made, so that one revolution of the machine makes the entire number of nails used. By this means I am enabled to supply nails as rapidly as they can be fed.

The start and stop motion mechanism (not shown) of the nail making devices is similar to that described in my patent, No. 317,199, the start-motion mechanism being automatically operated by the nail-driving devices to cause the nail-making machine to make one revolution within every two reciprocations of the cross-head.

The machine as thus organized is adapted to work continuously—that is, to automatically feed the heel-blank to the compressing, pricking, and loading devices, to automatically consolidate and prick it, to automatically make and deliver the nails to the blank, and to automatically drive them into the heel-blank to load it, and to free the loaded heel-blank continuously without stopping the machine. When a heel-blank is fed by hand, I prefer to mount upon the plate or head G of the pressure-spindle the guide-pins $o$, which are supported upon the slide-blocks $o'$, in which they have a downward vertical movement in opposition to the stress of the springs $o^2$. These slide-blocks are movable in guideways in the head G, and are pressed and held against the former P by means of the springs $o^2$. (See Figs. 2 and 4.) In lieu of these devices a heel grasping or holding device similar to that carried by the slide-plate H may be mounted upon the plate $g$. I prefer the pin construction, especially when the heel is also side compressed, and for the side compression I prefer to employ a solid die P, having a die-cavity $p$ and removable from the upper table $d$ of the machine, the die having flanges $p'$ to enter corresponding grooves formed in the side and rear of the table to receive and support it, so that the die is readily removable to permit another having a cavity of a different size to be substituted in its place. The die is locked in position in any desirable way. When the heels are hand fed and compressed, it will be desirable that the machine should stop after every second reciprocation of the cross-head. This organization of a machine enables heel-blanks, either side compressed or not, to be loaded with great precision and rapidity.

In lieu of a reciprocating nail-carrier E there may be used a rotary plate $s$, carrying a series of nail-carriers $s'$, which are turned or advanced in successive order from the nail-supplying mechanism F to the templet, in which event a carrier is always in position over the templet, and the awls are reciprocated through the holes of the carrier, a nail-carrier after delivering its nails to the holes of the templet remaining in position during the reciprocation of the next gang of awls, when the plate $s$ is turned to bring the next carrier, with a load of nails, into position over the templet. This rotary movement of the plate $s$ also brings each nail-carrier in successive order into position to receive a gang or group of nails from the nail-supplying devices. The plate may be intermittently rotated by hand or automatically, and in Figs. 8, 10, 13, 14, 15, and 16 I have represented devices for providing it with automatic rotation by means of mechanism similar to that for rotating the head, the plate $s$ having a shaft $s^2$, provided with a disk $s^3$, carrying cam-pins $s^4$, and a slide cam-plate $s^5$, the equivalent of the stationary cam-plate $c^2$. This slide cam-plate $s^5$ is represented in Figs. 8, 10, 15, and 16, and it is provided with a horizontal back-and-forth movement at suitable intervals by the cam $s^6$ on the vertical shaft $e^3$. This slide-plate has the two latches $s^7$ $s^8$, each of which is movable vertically downward from the plate in opposition to a spring $s^9$ and each of which has an inclined surface $s^{10}$, ending in a shoulder $s^{11}$. The shoulder $s^{11}$ of the latch $s^8$ is curved and forms, in connection with the curved edge $s^{12}$ of the section $s^{13}$ of the plate, a cam or guide for turning the disk $s^3$, and consequently the rotary plate $s$ upon the movement of the cam-plate $s^5$ away from the cam $s^6$ by means of one of the cam-pins $s^4$, against which it operates as it is moved. This causes the next cam-pin $s^4$ in order by the rotation of the cam-disk to be moved over the latch $s^7$ against the edge $s^{14}$ of the section $s^{13}$ of the slide-plate, the said cam-pin being then held between the shoulder $s^{11}$ of the latch $s^7$ and said edge $s^{14}$, and as soon as the said cam-pin is moved into this position the rotation of the disk, and consequently of the carrier-plate $s$, ceases, and the carrier-plate is locked rigidly with a nail-carrier in position over the templet, and it is held locked in this position during the descent of the drivers to drive the nails which it has delivered to the templet into the heel, and also during the reciprocation of the awls, which form the holes in the next heel-blank to be loaded, the slide-plate $s^5$ being held stationary by its cam during this movement. Upon the backward movement of the slide-plate the said cam-pin rides over the latch $s^8$ into a position to be turned a portion of a revolution by the operation of the cam-surfaces $s^{11}$ $s^{12}$ upon the forward movement of the slide-plate.

I would say that when desired the nail-making devices may be started by hand and the nail-carrier moved by hand instead of starting it automatically and moving it automatically.

The use of a single templet, as herein set forth, dispenses with double mechanism for a purpose where single mechanism of a like nature performs the same function. The machine is rendered simple of construction with the compound action of the alternate arrangement of the drivers and awls, as set forth. As set forth, the rotary head makes a complete revolution for every four reciprocations of the cross-head, which necessarily brings the alternate awls and drivers in quick succession over the templet, and makes the operation of loading a heel much more rapid. If two templets were used, it would require double mechanism to make a necessary connection of the parts, and, being slower, would necessarily require a longer peried of operation.

Having thus fully described my invention, I claim and desire to secure by Letters Patent of the United States—

1. In a heel-loading machine, the combination of a cross-head, a rotary head supported thereby and carrying two gangs or groups of awls and two gangs or groups of drivers in the order named, each of the two groups of awls and two groups of drivers being of the same arrangement and adapted for use with the same templet, with the said single templet having holes $d'$ and a heel-support having independent vertically and united horizontally operating adjusting devices in connection therewith, substantially as described.

2. In a heel-loading machine, the combination of a cross-head, a rotary head supported thereby and carrying two gangs or groups of awls and two gangs or groups of drivers in the order named, each of the two groups of awls and two groups of drivers being of the same arrangement and adapted for use with the same templet, with the said single templet having holes $d'$ and a heel-support or former having independent vertically and united horizontally operating adjusting devices in connection therewith, and a single nail-carrier E to feed nails in successive order for each group of drivers, substantially as described.

3. In a heel-loading machine, the combination of a cross-head, a rotary head supported thereby and carrying two gangs or groups of awls and two gangs or groups of drivers in the order named, each of the two groups of awls and two groups of drivers being of the same arrangement and adapted for use with the same templet, with the said single templet having holes $d'$ and a heel support or former having independent vertically and united horizontally operating adjusting devices in connection therewith, and a heel-blank carrier for moving heel-blanks in successive order between the templet and support, substantially as described.

4. In a heel-loading machine, the combination of a cross-head, a rotary head supported thereby and carrying two gangs or groups of awls and two gangs or groups of drivers in the order specified, each of the two groups of awls and two groups of drivers being of the same arrangement and adapted for use with the same templet, with the said single templet having holes $d'$ and a heel-support having independent vertically and united horizontally operating adjusting devices in connection therewith, and the heel side compressing or forming die, substantially as described.

5. The combination of a reciprocating cross-head, a rotary head supporting two gangs or groups of awls and two gangs or groups of drivers of the same arrangement and adapted for use with the same templet and alternated upon the head, as specified, and adapted to be automatically turned or rotated, the single templet D, having holes $d'$, the single nail-carrier E, the cam $e^2$, having the cam-groove $e'$ to operate the nail-carrier, as specified, and the heel-support G, having independent vertically and united horizontally operating adjusting devices in connection therewith, the cam $g^7$, constructed as specified, and intermediate connecting mechanism, substantially as described.

6. The combination, in a heel-loading machine, of the heel-support G with the heel-centering pins or arms $o$ and coacting mechanism, substantially as described.

7. The combination, in a heel-loading machine, of the heel-support G with the pins or arms $o$, extending above the same and independently horizontally and vertically movable in relation to the support, and coacting mechanism, substantially as described.

8. The combination, in a heel-loading machine, of the die, the heel-support G, movable in relation thereto, and the vertical yielding arms or pins $o$ and coacting mechanism, substantially as described.

9. The combination, in a heel-loading machine, of the templet D, the heel-support G the spindle $g'$, the post $g^2$, the slide-head $g^4$ and its adjustable head $g^{13}$ and cam $g^7$, and coacting mechanism, substantially as described.

10. The combination, in a heel-loading machine, of the templet having a hole $d'$ with a projecting spring-actuated pin M, carried by the rotary head $a$, and coacting mechanism, substantially as described.

11. The combination, in an organized heel-loading machine, of a reciprocating cross-head adapted to be continuously reciprocated, a head carried thereby supporting heel-pricking and nail-driving devices adapted to have continuous movement imparted to them to bring them automatically and successively into operative position, a single continuously-operated nail-carrier E, the single templet D, and the continuously-operated heel-support and pressure-block G, having independent vertically and united horizontally operating adjusting devices in connection therewith, the heel-blank carrier for feeding heels between the templet and heel-support and pressure-block, and an automatic nail-supplying machine for automatically supplying nails to the single nail-carrier, substantially as described.

12. The combination of the reciprocating cross-head A, the cranks B, connecting-rods $b'$, the gears $b$, shaft $g^9$, pinions $f$, and pulley-shaft F', the rotary head $a$, carried by the cross-head, the gangs or groups $a^5$ $a^7$ of awls and the gangs or groups $a^6$ $a^8$ of drivers, the head-turning mechanism, templet D, having holes $d'$, the nail-carrier E, having the holes $e$, the vertical shaft $e^3$, connected with the pulley-shaft by the worm-wheel $e^6$ and worm $e^7$, the cam $e^2$, having the cam-groove $e'$ to engage the cam-pin of the nail-carrier, the pressure-head and heel-support G, spindle $g'$, slide-head $g^4$, operating-cam $g^7$ on the shaft $g^8$, the gears $g^{11}$ on said shaft, and the pinion $g^{10}$ on the shaft $g^9$, which mesh with the gear $g^{11}$, substantially as described.

13. In a heel-loading machine, the combination of the templet D, the die, the heel support or former mounted upon a slide, the said slide, and a rotary cam $g^7$, constructed to operate the slide, as specified, substantially as described.

FREEBORN F. RAYMOND, 2D.

Witnesses:
J. M. DOLAN,
A. F. MACDONALD.